(12) United States Patent
Khulusi

(10) Patent No.: US 6,386,701 B1
(45) Date of Patent: May 14, 2002

(54) EYEWEAR FOR RELIEF OF COMPUTER VISION SYNDROME

(75) Inventor: Basimah Khulusi, Liberty, MO (US)

(73) Assignee: Basimah Khulusi MD, LLC, Liberty, MO (US)

( * ) Notice: Subject to any disclaimer, the term of this patent is extended or adjusted under 35 U.S.C. 154(b) by 0 days.

(21) Appl. No.: 09/825,486

(22) Filed: Apr. 3, 2001

(51) Int. Cl.[7] .................................................. G02C 7/16
(52) U.S. Cl. ........................................ 351/45; 351/158
(58) Field of Search .................................. 351/45, 158

(56) References Cited

U.S. PATENT DOCUMENTS

| | | | |
|---|---|---|---|
| 1,982,650 A | 2/1934 | Fletcher | 2/14 |
| 2,139,275 A | 12/1938 | Lee | 2/13 |
| 2,645,774 A | 7/1953 | Dale, Jr. | 2/12 |
| 2,710,966 A | 6/1955 | Dale, Jr. | 2/12 |
| 2,714,716 A | 8/1955 | McLennan | 2/12 |
| 2,728,078 A | 12/1955 | Taylor | 2/14 |
| 3,791,722 A | 2/1974 | Ahlberg et al. | 351/45 |
| 4,059,347 A | 11/1977 | Eitel | 350/319 |
| 4,106,119 A | 8/1978 | Taupin | 2/12 |
| 4,229,082 A | 10/1980 | Carreau et al. | 351/44 |
| 4,470,673 A | 9/1984 | Gilson et al. | 351/44 |
| 4,542,964 A | 9/1985 | Gilson et al. | 351/44 |
| 4,602,856 A | * 7/1986 | Marks | 351/44 |
| 5,189,445 A | 2/1993 | Stagner | 351/46 |
| 5,432,568 A | 7/1995 | Betz et al. | 351/45 |
| 5,521,653 A | 5/1996 | Anderson | 351/45 |
| 5,715,030 A | 2/1998 | Quaresima | 351/44 |
| 6,003,990 A | 12/1999 | Einhorn | 351/45 |
| 6,062,691 A | 5/2000 | Markson | 351/203 |

FOREIGN PATENT DOCUMENTS

GB          2 099 172          * 12/1982

* cited by examiner

*Primary Examiner*—Huy Mai
(74) *Attorney, Agent, or Firm*—Lathrop & Gage LC

(57) ABSTRACT

Eyewear directed to relieving eye-related problems caused by glare and reflections from light sources interfering with images on a computer screen generally characterized as CVS. The eyewear including a housing surrounding a person's face having a forehead portion, an opaque interior surface and an exterior surface. The housing formed to exhibit a spaced relation to the person's face defining an interior space to accommodate a pair of prescription lenses and a prescription lens frame. The housing further including a horizontal slot and a centrally disposed nose bridge portion, and integral left and right temple arm respectively extending from the housing formed to exhibit a spaced relation to the person's head and defining an interior space to accommodate a right and left temple arm of a pair of prescription glasses.

38 Claims, 3 Drawing Sheets

EYEWEAR FOR RELIEF OF COMPUTER VISION SYNDROME

FIELD OF THE INVENTION

The present invention relates to eyewear directed to relieving eye-related problems such as, eye muscular fatigue, headaches, and eye redness, such problems generally being identified as computer vision syndrome ("CVS"), or asthenopia, resulting from the use of a video display terminal. The visual science dictionary defines asthenopia as the subjective complaint of uncomfortable, painful, irritable vision.

BACKGROUND OF THE INVENTION

Computers have equaled the telephone in becoming the most indispensable piece of office equipment. Because computer use is such a visually demanding task, vision problems and symptoms have become very common in today's workplace. A survey of optometrists indicated that 10 million eye examinations are given annually in this country, primarily because of vision problems related to visual display terminals (VDT) use. This series of eye symptoms has became known as computer vision syndrome (CVS). This condition most commonly occurs when the viewing demand of the task exceeds the visual abilities of the VDT user. Almost three-quarters of people suffering from the condition are those who use corrective eyeglasses. The physiological implications for the disparity in those suffering from the condition continues to confound professionals in the field. The problem purportedly is exacerbated by the reflections produced by the lenses of the eyeglasses.

CVS is a byproduct of excessive VDT screen viewing without regard to practical visual hygiene. The symptoms of CVS can be diminished, or eliminated, if proper equipment is employed. The American Optometric Association defines CVS as that complex of eye and vision problems related to near work which are experienced during or related to computer use. The symptoms can vary, but they include eyestrain, headaches, blurred vision (distance, near, or both), dry and irritated eyes, slowed refocusing, neck ache, backache, sensitivity to light, and double vision.

The eyes are designed to be stimulated by light and to control the amount of light entering through the pupil. The predominant cause of CVS is the overwhelming extraneous light and information entering the eye when a person is using a VDT. Limiting the extraneous light coming from overhead lights can result in an immediate improvement in comfort. Controlling the amount of light that enters the eye from different directions when the operator is using the VDT will result in optimal eye relief. Limiting the light will allow the operator's eyes to concentrate on the task at hand. As a consequence, blocking the light and information coming to the eye from different directions, except for the computer screen, makes it the single most critical parameter requiring control in order to minimize CVS.

A person engaging in near vision work is at a great risk of experiencing discomfort glare when the source of light is brighter or closer to the point of attention. This same principal applies when the light coming from behind the person, reflects on the glasses and enters the eye from a close proximity. Another significant contributor to CVS are veiling reflections, those images that are repeatedly transmitted between the computer screen and the lenses of the eyeglasses.

All segments and age ranges of society are experiencing exposure to VDTs and engaging in activities using computers such for shopping, playing games, corresponding and performing research. This increasing exposure is occurring all over the world resulting in an explosion of the numbers of individuals suffering from CVS. According to an Occupational Safety and Health Administration report published in November of 1999 the U.S. government estimates that 90% of the 70 million US workers using computers for more than 3 hours per day experience CVS in some form. In addition, a study conducted by the Department of Human Factors Engineering, University of Occupational and Environmental Health, Japan, reported that visual strain occurred as quickly as 60 minutes after commencing VDT operation.

The eyelids and tissue above the eyes contain glands which secrete tears. These tears cover the eye surface and maintain moisture for normal eye function. The tears also help to maintain the proper oxygen balance of the external eye structures and to keep the optical properties of the visual system maintained. The normal tear layer is cleaned off and refreshed by the blinking action of the eyelids. The blink reflex is one of the fastest reflexes of the body, and is present at birth; however, our blink rate varies with different activities, faster when we are very active, and slower when we are still or concentrating. Research has shown that the blink rate of VDT workers drops significantly during work at a VDT, compared with work activities prior to, and following VDT work. Possible explanations for the decreased blink rate include concentration on a task or a relatively limited range of eye movements. The size of the eye opening is related to the direction of the gaze. As a person gazes higher, the eyes open wider and the amount of tear evaporation roughly relates to the extent of the eye opening. The higher the gaze angle when viewing a VDT screen, the greater the resulting tear loss. The higher gaze angle also results in a greater percentage of incomplete blinks. Since contact lenses float on tears, people that use them are especially vulnerable to discomfort resulting from the dryness and have been instructed by the professionals not to use them during computer work.

Human eyes are stimulated by light and are capable of controlling the amount of light entering the eye through the pupil. There are conditions existing today that are foreign to the natural lighting environment, and which can cause the eye to experience an adverse reaction to light. The largest single factor in the workplace is glare. Generally speaking, there are 2 kinds of glare. Direct glare occurs, for example, when an operator sits at their computer and a light shines directly into their eyes. Reflective glare is far less perceptible and is generated by light sources from behind, above or even next to the computer operator. Reflective glare bounces needless illumination onto the user's monitor or lenses of the eye glasses. Light from these unexpected sources is just as likely to result in CVS.

Discomfort from glare is caused primarily by great disparities in brightness in the field of view. It is much more desirable to eliminate bright sources of light from the field of view and to strive to obtain a relatively even distribution of luminaries. A person is at great risk of experiencing discomfort from glare when the source of light is brighter and closer to the point of attention. One of the primary reasons that discomfort glare is a problem for computer users is that light often leaves the overhead flourescent fixture in a wide angle, resulting in light directly entering the worker's eyes. This is particularly a problem for computer workers because they are generally looking horizontally into the screen. Bright, open windows pose the same risks as overhead light fixtures.

A multitude of solutions to control CVS have been offered. Some of these efforts have yielded limited benefits.

Some of the solutions have been contradictory, for example, dimming lights to minimize glare, and yet maintaining light bright enough to see text on a document in order to prevent strain. Also, for many companies it is nearly impossible to implement environmental solutions when large numbers of individuals operating computers sit near windows which transmit ambient light that may need to be controlled. Some individuals may want the window shades open to provide sunlight and warmth, while other computer operators in close proximity may desire to have the windows closed to limit the amount of ambient and reflected light falling upon their computer screen.

The difficulty associated with controlling the multitude of environmental factors has been the major reason why all the solutions available have not eliminated CVS. New parabolic fixtures and lighting techniques address only part of the problem. Screen filters, eye drops, software programs, wall and window coverings and ergonomic furniture lessen CVS symptoms to some degree; however, none of these techniques or products changes the lighting environment, so the number and frequency of CVS cases continues to grow.

Various types of optical apparatus have been proposed to alleviate or reduce such eyestrain by placing optical devices between the operator and the computer screen. For example U.S. Pat. No. 4,712,870 to Robinson describes a magnifying Fresnell lens which is interposed between the monitor and the operator to magnify the monitor screen image. Another such Fresnell magnifying lens and glare reduction system is disclosed in U.S. Pat. No. 4,577,928 to Brown. An anti-glare device comprising a filter screen for attachment to a cathode ray tube computer terminal display is disclosed in U.S. Pat. No. 4,253,737 to Thomsen. An adjustable lens holder for various magnifier, color tinting or anti-glare lenses is disclosed in the U.S. Pat. No. 4,529,268 to Brown.

Numerous anti-glare shields and eye shades have also been proposed for various purposes. For example, various eye shields have been proposed for drivers and pilots to reduce the glare from the sun or lights. Other eye shields have been proposed which serve as blinders to avoid distraction during various activities and for training exercises. Examples of these types of eye shields are disclosed in U.S. Pat. Nos. 2,933,734; 3,330,051; 3,308,478; 3,225,459; 5,189,445; 5,261,124 and 6,062,691. These devices do not provide adequate protection from glare and reflection from ambient light, as well as the glare from the computer terminal. Furthermore, these devices are ergonomically undesirable and create undesirable side-effects. Examples of goggles or eyeshields disclosed at U.S. Pat. Nos. 3,791,722 and 4,059,347 insufficiently limit the entry of light to the eyes and have a structure that is not conducive to the wearing of prescription glasses, and the claimed structure will result in ergonomic problems of their own as a result of the pressure needed to hold them against the face. Reiterating previously relayed statistics, nearly three-quarters of individuals suffering from CVS are wearers of eye glasses.

SUMMARY OF THE INVENTION

A principal object of the present invention is to provide suitable eyewear and a method for use by a computer user to reduce the symptoms and detrimental effects of CVS which include eyestrain, headaches, fatigue, blurring of vision, decreased productivity, dry eyes, progressive increase in the viewer's level of nearsightedness and the like, associated with viewing of video display terminals. The eyewear limits the amount of light from all angles, except from directly forward, that reaches the eye of the user. The invention further minimizes veiled reflections and limits viewing to a central slot resulting in relaxation of tired muscle groups.

Another object of the invention is to provide accommodative eyewear to control the amount of light that enters the eye at any one time when the computer operator is using a computer, and thus controlling information to the eye from the light.

A further object of the invention is to provide accommodative eyewear to control glare generated by light sources from behind, above and next to the operator, and to eliminate glare reflecting between the VDT and corrective eye glass lenses.

A further object of the invention is to provide eyewear that will accommodate existing prescription eye glasses and that can be worn over and/or around the existing prescription eye glasses.

A further object of the invention is to provide accommodative eyewear that covers the eyes extensively limiting the field of vision to an aperture in the front of the eyewear and further limiting the amount of light that is allowed to enter and impinge upon the eye.

A further object of the invention is to provide accommodative eyewear that controls excyclorotation by limiting viewing to a central viewing area thereby relaxing tired eye muscle groups.

A further object of the invention is to provide accommodative eyewear that traps air around the eye, preventing airflow, resulting in preservation of the moisture content around the eye, thereby minimizing dryness.

A further object of the invention is to provide accommodative eyewear that exerts light pressure around the orbital area resulting in a direct massaging effect, thereby reducing eye fatigue, brain fatigue, and reducing myopia.

A further object of the invention is to provide accommodative eyewear that because of the limited field of vision associated with wearing the eyewear the user is required to move their head, neck and eyes in search of objects around their working area resulting in more frequent blinking thereby minimizing or eliminating the onset of CVS.

A further object of the invention is to improve worker productivity and well-being, reduce absenteeism and reduce visits to physicians because of CVS.

A further object of the invention is to provide accommodative eyewear leaving the ears uncovered so that the eyewear can be used simultaneously with a telephone, or with phone headsets, or over the ear phone headsets, without causing any undue pressure on the skin.

A further object of the invention is to provide eyewear that is capable of accommodating clip on anti-reflective lens, a tinted lens, a magnifying lens, a scratch resistant lens or an ultra-violet light resistant coated lens.

A further object of the invention is to provide an ergonomic eye shield for blocking the glare usually encountered by a computer operator.

The objects of the invention are basically attained by providing a housing form fitted to the face of the person, the housing having an exterior surface and a completely opaque interior surface, the housing formed to exhibit a spaced relation to the person's face defining an interior space to accommodate a pair of prescription lenses and a prescription lens frame, the housing including a horizontal slot disposed on the level of the center of rotation of the person's eyes. In addition, the housing has a centrally disposed nose bridge portion; an integral left and right temple arm respectively extending from the housing formed to exhibit a spaced relation to the person's head and defining an interior space to accommodate a right and left temple arm of a pair of prescription glasses. The form fitted housing intercepts and blocks all light to the eyes of the person except light transmitted through the horizontal slot.

The objects of the invention are further attained by providing eyewear to cover the eyes of the person; the eyewear comprising a housing surrounding the person's face, the housing having an upper and lower surface form fitting the face of the person, a horizontal slot disposed on the level of the center of rotation of the person's eyes, a centrally disposed nose bridge portion, an exterior surface and a completely opaque interior surface. The housing is formed to exhibit a spaced relationship to the person's face defining an interior space to accommodate a pair of prescription lenses and a prescription lens frame; the housing further having an integral left and right temple arm respectively extending from the housing formed to exhibit a spaced relation to the person's head and defining an interior space to accommodate a right and left temple arm of a pair of prescription glasses. Then covering the eyes with the eyewear followed by viewing the computer screen and admitting light from the computer screen to the eyes through the horizontal slot, while blocking the admission to the eyes of glare.

BRIEF DESCRIPTION OF THE DRAWINGS

The foregoing summary, as well as the following detailed description of the preferred embodiments of the invention, will be better understood when read in conjunction with the accompanying drawings. For the purpose of illustrating the invention, there is shown in the drawings an embodiment which is presently preferred. It should be understood, however, that the invention is not limited to the precise arrangement and instrumentalities shown. In the drawings.

DETAILED DESCRIPTION OF INVENTION

While this invention is susceptible of embodiments in many different forms, this specification and the accompanying drawings disclose only preferred embodiments of the invention. The invention is not intended to be limited to the embodiments so described, and the scope of the invention will be pointed out in the appended claims.

Figure 1:
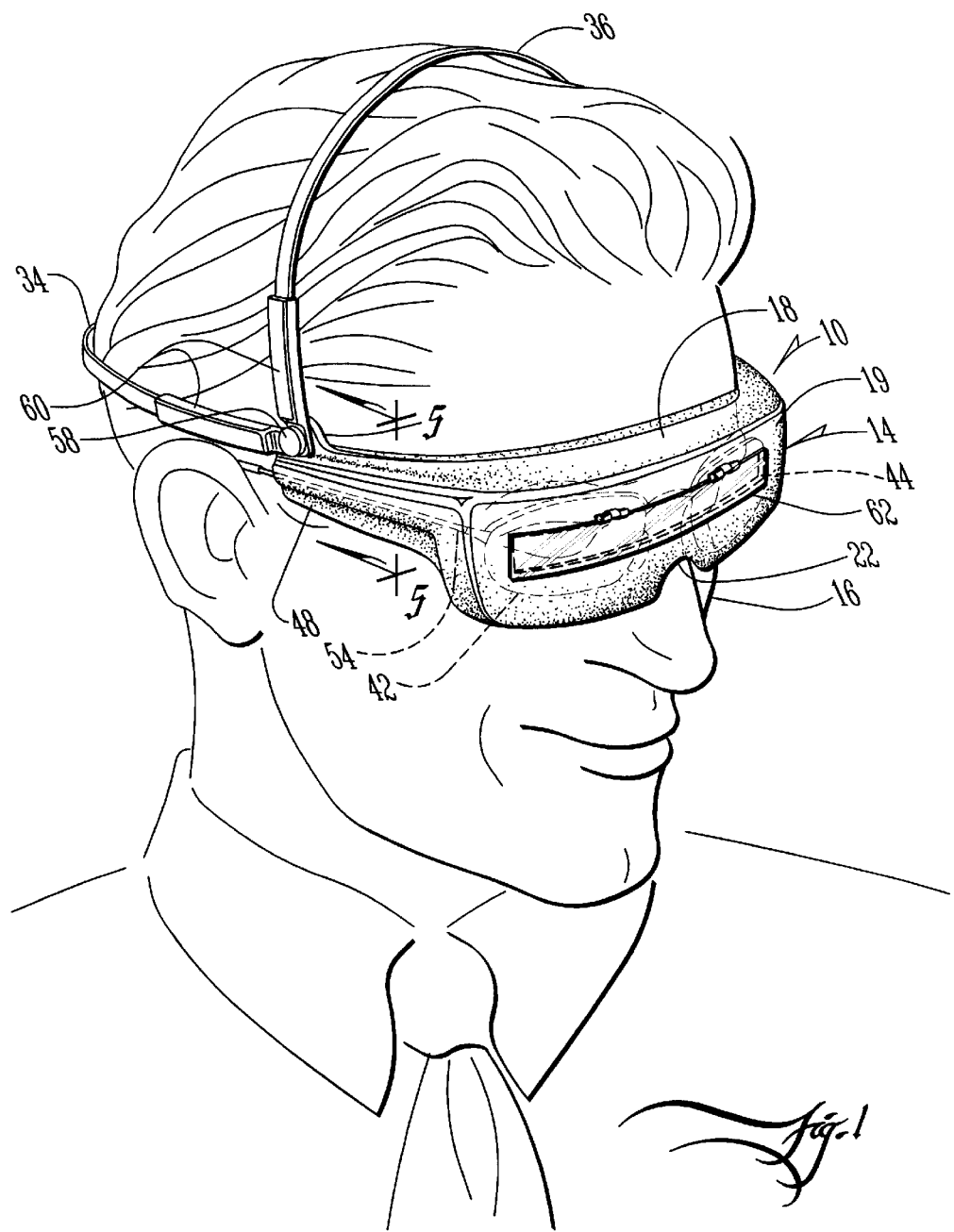
FIG. 1 is a three quarter view of the eyewear applied to the head of a wearer.
Figure 2:
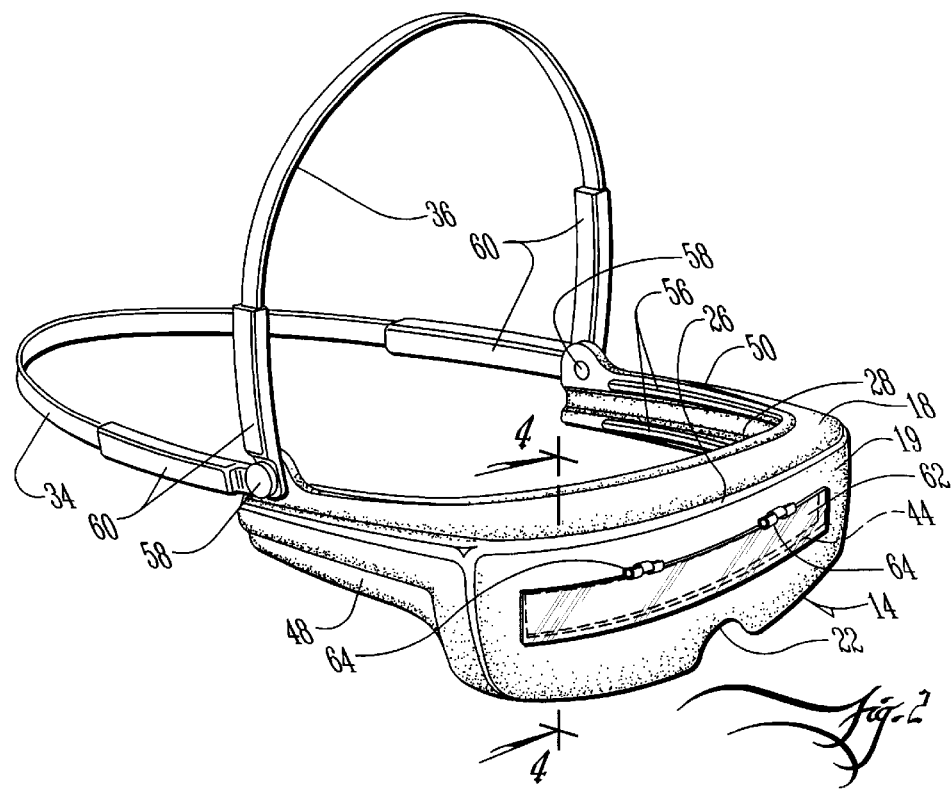
FIG. 2 is a perspective view of the eyewear.
Figure 4:
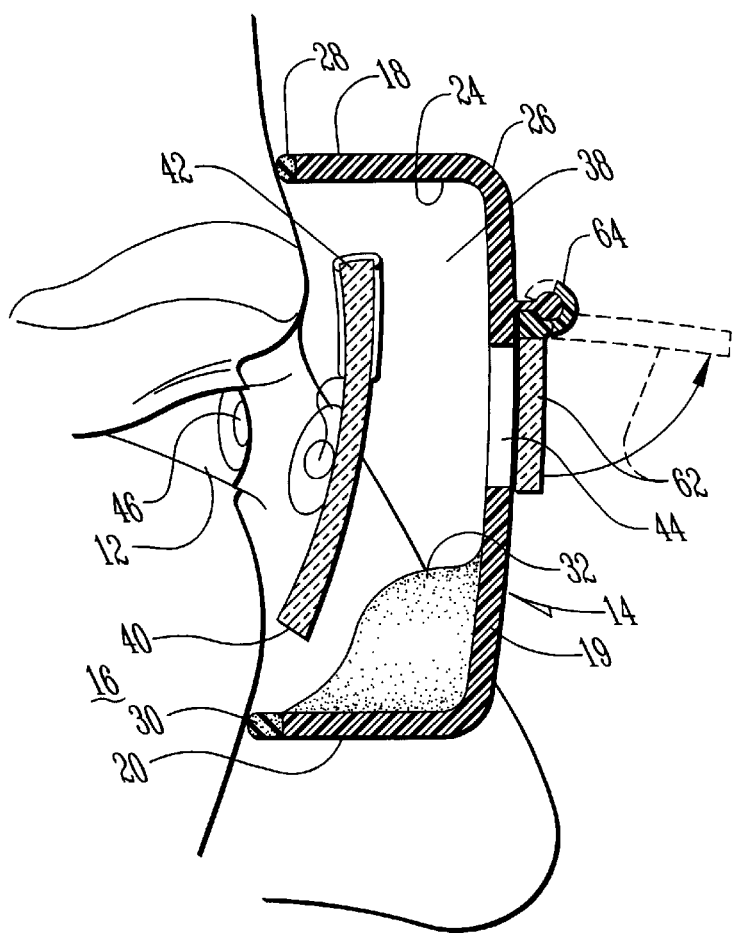
FIG. 4 is a sectional view of the eyewear of FIG. 2 along line 4—4 passing through the horizontal slot of the eyewear, the face being retained intact.

As shown in FIGS. 1 and 4, the present invention is directed to eyewear 10 for reducing eye strain caused by glare and reflections from light sources interfering with images on a computer screen. The present invention is principally directed to use by people who spend large amounts of time at computer terminals to minimize the incidence of computer visions syndrome (CVS). The eyewear 10 is an ergonomically designed device to minimize the amount of glare that is directed to the eye 12 of the person. The eyewear 10 includes a housing 14 surrounding a person's face 16 in a form fitting manner having a forehead portion 18, a frontal portion 19, a lower portion 20 interrupted by a nose bridge 22, an interior surface 24 and an exterior surface 26. The housing 14 is dimensioned to shield the wearer's eye 12 from glare and reflected light in the working environment. In particular, the housing 14 is dimensioned to be able to obstruct overhead lighting which may interfere with the ability of the user to focus on the computer screen. As depicted in FIG. 4, compressible padding 28, 30 is attached to the forehead portion 18 and lower portion 20 of the housing 14 and provides a comfortable and close fit to the face 16 of the user. Likewise, the nose bridge 22 is fitted with padding 32 to provide a comfortable fit for the user. The padding 28, 30, 32 can be an absorbent or non-absorbent foam pad, cloth or any other suitable material. The padding 28, 30, 32, in conjunction with the head encompassing members 34, 36 are depicted in FIG. 2. As further shown in FIG. 2, the head encompassing members 34, 36 maintain the position of the housing and first and second temple arms against the face and head of the wearer and facilitate the formation of a seal between the housing and the face of the user that limits the entry of light into the interior space 38 of the housing 14 and ultimately to the eye 12 of the wearer. Alternative embodiments of the means for securing the housing and the first and second temple to the head include the use of one or more elastic bands, a cranial hammock that covers a wider area of the skull than a single band and which can be repositioned to maximize user comfort. As configured, the eyewear 10 can be comfortably worn by the user and is able to accommodate a wide range of facial features.

The seal formed by the padding 28, 30, 32 against the face of the person also traps air around the eye, preventing airflow and evaporation, resulting in preservation of the moisture content around the eye, thereby minimizing dryness of the eye. This seal can be especially beneficial to contact lens wearers. The padding 28, 30 attached to the housing also applies a light pressure around the orbital area of the eye 12 resulting in a direct massaging effect, thereby reducing eye fatigue, brain fatigue, reducing myopia and improving computer user productivity.

Referring now to FIG. 4, means for denying transmittance of light through the housing 14 to the interior space 38 includes applying an opaque coating to the interior surface 24 of the housing 14. An alternative means for denying transmittance of light to the interior space 38 is to utilize a housing material that is itself completely opaque. The opaque interior surface 24 or opaque housing material serves as a black-body to absorb substantially all of the wavelengths of light that are directed at it. An opaque interior surface 24, or opaque housing material, enhances the functionality of the eyewear 10 by limiting the light that enters the eye 12 of the wearer to that which enters the interior space 24 through the horizontal slot 44 in the frontal portion 19.

As shown in FIGS. 1 and 4, the housing 14 is formed to exhibit a spaced relation to the person's face 16 defining an interior space 38 to accommodate a pair of prescription lenses 40 and a prescription lens frame 42. The housing 14 can be configured in a variety of sizes, without compromising functionality, to accommodate the vast array of sizes and shapes of prescription glasses that exist on the market.

As shown in FIG. 4, the housing 14 includes a horizontal slot 44 in the frontal portion 19 on the level of the center of rotation of the person's eye 12, and a centrally disposed nose bridge 22. The horizontal slot 44 is wider than the diameter of the pupil 46 of the wearer's eye 12. The horizontal slot 44, as shown in the embodiment of FIGS. 2 and 3, is at least three inches in length and provides the minimal field of vision to accommodate the traditional working environment encountered by a wearer interacting with a computer keyboard and visual display terminal.

Figure 3:
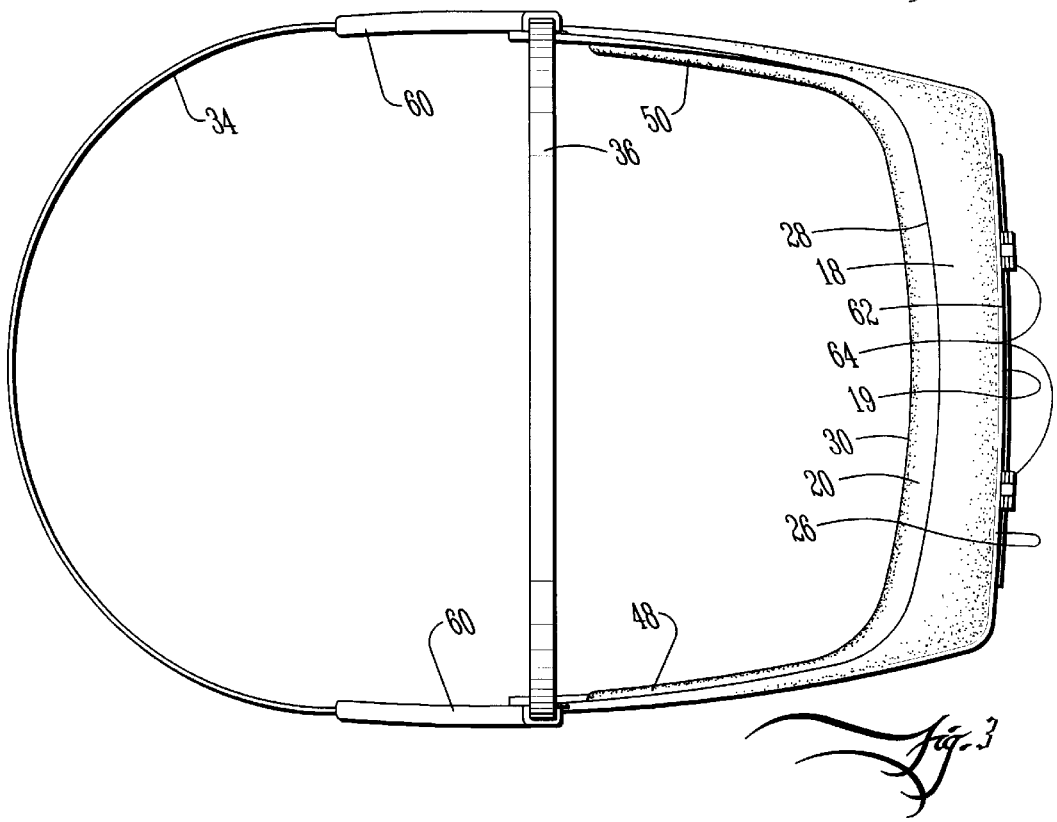
FIG. 3 is a top plan view of the eyewear.
Figure 5:
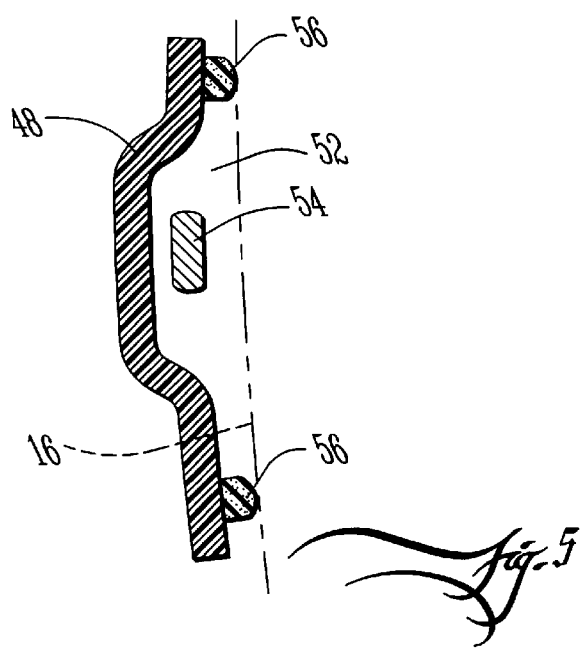
FIG. 5 is a sectional view of the eyewear of FIG. 1 along line 5—5 passing through the right temple arm of the housing formed to exhibit a spaced relation to the person's head and defining an interior space to accommodate a temple arm of a pair of prescription glasses.

As depicted in FIG. 3, the housing also includes a first housing temple arm 48 and second housing temple arm 50 extending from the housing 14 formed to exhibit a spaced relation to the person's face 16 and defining an interior space 52 to accommodate the temple arms 54 of a pair of glasses. As shown in FIG. 5, padding 56 is also utilized on the first and second housing temple arms 48, 50 to enhance the wearer's comfort and to minimize the intrusion of ambient light that could enter the wearer's eyes thereby contributing to CVS. The padding 56 can be an absorbent or non-absorbent foam pad, cloth or any other suitable material.

In the embodiment shown in FIGS. 1–3, a pivotally mounted pair of head encompassing members 34, 36 are secured to the first and second housing temple arms 48, 50. The head encompassing members 34, 36 are attached to the housing temple arms 48, 50 with rivets 58 or any other suitable attachment mechanisms that will permit independent rotation of the adjustable head encompassing members 34, 36 about the point of attachment. As shown in FIG. 2, one embodiment of the adjustable head encompassing members 34, 36 has them oriented at 90 degrees to one another. Alternative configurations, of less than or more than 90 degrees separation, may prove to be equally as functional and comfortable for many users. The rivets 58 or other suitable pivotal attachment mechanisms will facilitate rotation of the head encompassing members.

Adjustable head encompassing members 34, 36 as shown in FIG. 2, will accommodate a wide range of head sizes. Each head encompassing member 34, 36 has two telescoping pods 60 from which additional member length can be extracted when attempting to accommodate a larger head or into which excess member length can be retracted if attempting to accommodate a smaller head. The telescoping pods 60 are self-locking and will secure the head encompassing members in place once a specific adjustment has been made. In addition to comfortably securing the housing 14 to the person's face 16, the head encompassing members 34, 36 form a light-tight seal along the forehead portion 18, the lower portion 20, the nose bridge 22 and the housing temple arms 48, 50 by placing padding 28, 30, 32 between the face and the housing. The padding serves to minimize gaps and to eliminate the entry of light into the interior space 38 by any route other than through the horizontal slot 44 in the frontal portion 19.

The eyewear 10 is preferably formed of a polymeric material. Examples of polymers include, but are not limited to, inorganic siloxane polymers, thermoplastic elastomers, nylon, polyolefins, polyesters and polycarbonates and semi-synthetic cellulosics. In the preferred embodiment of the invention, the housing 14 is an integrally molded article preferably formed as a single piece. The housing can be produced using standard injection molding techniques and has a tint selected for providing a predetermined transmittance of light. As an alternative to a polymeric material, the housing could also be formed or machined from a lightweight metal such as aluminum or titanium, or produced from other materials such as wood, rubber or cork.

In the practice of the invention, the user covers the eyes with the eyewear housing such that the midpoint of the height of the horizontal slot 44 is level with the center of rotation of the person's eye 12. The user then adjusts the head encompassing members 34, 36 to secure the padding 28, 30, 32 lightly against the face of the user. FIGS. 1–3 show one embodiment of the means for securing the housing and the integral first and second temple arms of the housing to the face of the wearer. The head encompassing members 34, 36 may consist of metal head bands, plastic head bands or any other suitable material.

The head encompassing members 34, 36 can be lengthened or shortened, as required for optimal comfort and seal, by withdrawing or retracting the requisite amount of head encompassing member from or into the telescoping pods 60 located adjacent the rivet 58 or other suitable attachment mechanism. The user may also desire to rotate the head encompassing members 34, 36 to an orientation other than ninety degrees separation to obtain a comfortable fit and to enhance the ergonomic effect of the eyewear.

The eyewear 10 is able to accommodate a variety of facial features and can be worn by the user without interfering with the user's glasses since the housing 14 and the temple arms 48, 50 are dimensioned to fit over the user's glasses and the nose bridge 22 can be positioned to avoid interfering with the glasses. The user then views the computer screen through the horizontal slot 44 which is positioned on the same level as the wearer's eyes. The housing 14 admits light from the computer screen to the eyes through the horizontal slot 44, however, the housing material itself, or an opaque coating applied to the interior surface of the housing, limits the entry of light to the eyes.

FIG. 4 shows an embodiment of a lens 62 detachably secured in place adjacent the horizontal slot 44. The optional detachable lens 62 can provide ultra-violet light protection, provide magnification or even serve as an additional filter to permit light of a predetermined transmittance to pass into the interior space 38. The detachable lens can be of a polycarbonate material, a styrene or styrene polymer or a high impact polystyrene or any other suitable material to minimize shattering of the lens upon impact. The means for detachably securing the lens 62 adjacent the horizontal slot 44 includes the use of one or more hooks, a hinge assembly, velcro, a groove in the housing to slide the lens into, or any other suitable attachment mechanisms.

From the foregoing description, it can be seen that the present invention comprises an improved device for reducing vision problems associated with reducing eye strain caused by glare and reflections from light sources interfering with images on a computer screen. It will be appreciated by those skilled in the relevant art that obvious changes can be made to the embodiments described in the foregoing description without departing from the broad inventive concept thereof. It is understood, therefore, that this invention is not limited to the particular embodiment disclosed, but is intended to cover all obvious modifications thereof which are within the scope and spirit of the inventions as defined by the appended claims.

What is claimed is:

1. Eyewear for reducing eye strain caused by ambient light glare and reflections from light sources interfering with images on a computer screen and for improving ergonomic conditions, the eyewear comprising:

a housing surrounding the face of a wearer having a forehead portion, a lower portion, a frontal portion positioned between the forehead portion and the lower portion, an interior surface and an exterior surface, the housing being completely opaque and formed to exhibit a spaced relation to the face of the wearer defining an interior space to accommodate a pair of prescription lenses, a prescription lens frame and temple arms, the housing further including a horizontal slot in the frontal portion disposed on the level of the center of rotation of the eyes of the wearer, a centrally disposed nose bridge, and at least one head encompassing member securing the housing to the head of the wearer.

2. The eyewear of claim 1, wherein a first and second temple arm extend from the housing formed to exhibit a spaced relation to the face of the wearer and defining an interior space to accommodate a right and left temple arm of a pair of prescription glasses.

3. The eyewear of claim 2, wherein the at least one head encompassing member comprises a pivotally mounted adjustable telescoping head band secured to the first and second temple arms.

4. The eyewear of claim 2, wherein padding is disposed between the housing and the face of the wearer and between the first and second temple arms and the face of the wearer.

5. The eyewear of claim 2, wherein the first and second temple arms terminate prior to the ears of the wearer.

6. The eyewear of claim 1, wherein the vertical dimension of the horizontal slot is greater than the diameter of the pupils of the eyes of the wearer.

7. The eyewear of claim 1, wherein the housing comprises at least one of a polymeric material, titanium, aluminum, cork, rubber or wood.

8. The eyewear of claim 1, wherein the horizontal dimension of the horizontal slot is at least 3 inches.

9. The eyewear of claim 1, wherein the forehead portion, lower portion and nose bridge of the housing are shaped to conform to the face of the wearer in close abutting relationship.

10. The eyewear of claim 1, wherein the housing has a tint selected for providing a predetermined transmittance of light.

11. The eyewear of claim 1, wherein the at least one head encompassing member comprises a pivotally mounted adjustable telescoping head band secured to the housing.

12. The eyewear of claim 1, wherein a lens is detachably held in place adjacent the horizontal slot.

13. The eyewear of claim 12, wherein the lens comprises at least one of a ultraviolet-light inhibiting lens, a magnifying lens and a lens having a tint selected for providing a predetermined transmitted of light.

14. The eyewear of claim 1, wherein padding is disposed between the housing and the face of the wearer.

15. A method for improving visual display operator performance by reducing asthenopia of a person viewing a computer screen by limiting the amount of ambient light, glare and reflection reaching the eyes, the method comprising the steps of:

providing eyewear having an opaque housing surrounding the face of the wearer, the housing having an upper portion, a lower portion and a frontal portion disposed between the upper and lower portion, the upper portion and the lower portion form fitting the face of the wearer, a horizontal slot in the frontal portion disposed on the level of the center of rotation of the eyes of the wearer, a centrally disposed nose bridge, an exterior surface and an interior surface; the housing formed to exhibit a spaced relationship to the face of the wearer defining an interior space to accommodate a pair of prescription lenses and a prescription lens frame, and at least one head encompassing member securing the housing to the head of the wearer;

removably positioning the eyewear on an operator who will view a visual display terminal;

orienting the housing against the face of the operator to form fit the face of the wearer to limit the entry of light to only through the horizontal slot;

adjusting the at least one head encompassing member;

viewing the visual display terminal.

16. The method as in claim 15 wherein the housing has a first and second temple arm extending from the housing formed to exhibit a spaced relation to the face of the wearer and defining an interior space to accommodate a right and left temple arm of a pair of prescription glasses.

17. The method as in claim 16, wherein the orienting step comprises orienting the housing upper portion, lower portion, nose bridge and first and second temple arms against the face of the wearer in close abutting relationship to limit the entry of light into the interior space.

18. The method as in claim 16, wherein the adjusting step comprises adjusting the placement of the housing upper portion, lower portion, nose bridge and first and second temple arms against the face of the wearer and by selectively adjusting the head encompassing member to secure the housing to the head of the wearer and to enhance wearer comfort.

19. The method as in claim 15, wherein the orienting step comprises orienting the housing upper portion, lower portion and nose bridge portion against the face of the wearer in close abutting relationship to limit the entry of light into the interior space.

20. The method as in claim 15, wherein the at least one head encompassing member interconnecting the first and second housing temple arms comprises a pivotal telescoping head band.

21. The method as in claim 20, wherein the pivotal telescoping head band can be retracted and extended from a pod to accommodate a variety of head sizes.

22. The method as in claim 15, wherein the adjusting step comprises adjusting the placement of the housing upper portion, lower portion and nose bridge against the face of the wearer and by selectively adjusting the head encompassing member to secure the housing to the head of the wearer and to maximize wearer comfort.

23. Eyewear for reducing asthenopia of a wearer viewing a visual display terminal located an operative distance from the eyes of the wearer and within an environment of glare generated by various lighting sources comprising:

a housing form fitted to the face of the wearer having a forehead portion, a lower portion and a frontal portion positioned between the forehead portion and the lower portion, an interior surface and an exterior surface; the housing formed to exhibit a spaced relation to the face of the wearer defining an interior space to accommodate a pair of prescription lenses and a prescription lens frame;

means for denying the transmittance of light through the housing to the interior space;

a horizontal slot in the frontal portion disposed on the level of the center of rotation of the eyes of the wearer;

a centrally disposed nose bridge portion;

means for securing the housing to the face of the wearer; and means for detachably securing a lens adjacent to the horizontal slot of the housing.

24. The eyewear of claim 23, wherein a first and second temple arm extend from the housing formed to exhibit a spaced relation to the face of the wearer and defining an interior space to accommodate a right and left temple arm of a pair of prescription glasses.

25. The eyewear of claim 24, wherein the means for securing the housing and the first and second temple arms to the face of the wearer is at least one head encompassing member interconnecting the first and second housing temple.

26. The eyewear of claim 25, wherein the head encompassing member is a pivotally mounted adjustable telescoping head band.

27. The eyewear of claim 24, wherein padding is disposed between the housing and the face of the wearer and between the housing first and second temple arms and the face of the wearer.

28. The eyewear of claim 24, wherein the first and second housing temple arms terminate prior to the ears of the wearer.

29. The eyewear of claim 23, wherein the vertical dimension of the horizontal slot is greater than the diameter of the pupil of the eyes of the wearer.

30. The eyewear of claim 23, wherein the horizontal dimension of the horizontal slot is at least 3 inches.

31. The eyewear of claim 23, wherein the housing comprises at least one of a polymeric material, titanium, aluminum, cork, rubber or wood.

32. The eyewear of claim 23, wherein the housing has a tint selected for providing a predetermined transmittance.

33. The eyewear of claim 23, wherein the means for securing the housing to the face of the wearer is at least one head encompassing member interconnecting the first and second housing temple arms.

34. The eyewear of claim 23, wherein the means for securing the housing to the face of the wearer is at least one head encompassing member.

35. The eyewear of claim 34, wherein the head encompassing member is a pivotally mounted adjustable telescoping head band.

36. The eyewear of claim 23, wherein the means for detachably securing the lens adjacent the horizontal slot comprises at least one of a hook, a hinge or a groove.

37. The eyewear of claim 23, wherein padding is disposed between the housing and the face of the wearer.

38. The eyewear of claim 23, wherein the means for denying the transmittance of light through the housing to the interior space comprises at least one of an opaque housing material or a coating applied to the interior surface of the housing.

* * * * *